United States Patent
Wang et al.

(10) Patent No.: US 7,928,776 B2
(45) Date of Patent: Apr. 19, 2011

(54) VOLTAGE DETECTION DEVICE

(75) Inventors: Ning Wang, Shenzhen (CN); Cheng Qian, Shenzhen (CN); Yong-Xing You, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 456 days.

(21) Appl. No.: 12/195,447

(22) Filed: Aug. 21, 2008

(65) Prior Publication Data

US 2009/0313494 A1 Dec. 17, 2009

(30) Foreign Application Priority Data

Jun. 13, 2008 (CN) .......................... 2008 1 0302142

(51) Int. Cl.
*H03K 17/22* (2006.01)
(52) U.S. Cl. ..................... 327/143; 327/77; 363/21.02
(58) Field of Classification Search .............. 363/19–20, 363/21.01, 21.02, 21.03, 97; 327/77, 74, 327/88, 143, 205, 538, 540, 544; 307/273, 307/355, 356, 297, 491; 323/304, 313; 322/22, 322/23
See application file for complete search history.

(56) References Cited

U.S. PATENT DOCUMENTS

| | | | | |
|---|---|---|---|---|
| 4,956,761 A * | 9/1990 | Higashi | ........................... | 363/19 |
| 5,206,580 A * | 4/1993 | Okamoto et al. | ................ | 322/46 |
| 5,266,882 A * | 11/1993 | Morishita | ........................ | 322/28 |
| 6,147,521 A * | 11/2000 | Degoirat et al. | ................. | 327/81 |
| 6,370,043 B1 * | 4/2002 | Yasumura | ................... | 363/21.02 |
| 6,492,849 B2 * | 12/2002 | Ikoma et al. | ................... | 327/143 |
| 6,686,782 B2 * | 2/2004 | Kinoshita et al. | ............. | 327/143 |
| 7,030,668 B1 * | 4/2006 | Edwards | ........................ | 327/143 |

* cited by examiner

*Primary Examiner* — Rajnikant B Patel
(74) *Attorney, Agent, or Firm* — Zhigang Ma

(57) ABSTRACT

An voltage detection device includes a comparator circuit comprising a first input terminal connected to a system power supply, a second input terminal connected to a standby power supply, an output terminal capable of outputting a control voltage according to comparison result; an indicator circuit; and a switch circuit connected between the standby power supply and the indicator circuit, comprising a control terminal to receive the control voltage from the comparator circuit thereby to control the standby power supply supplied to the indicator circuit or not; a power state terminal of the computer connected to a node between the standby power supply and the indicator circuit, wherein the power state terminal is at a low level when the computer is turned off. The voltage detection device can ensure that all the power supplies provide power to the computer components normally.

18 Claims, 1 Drawing Sheet

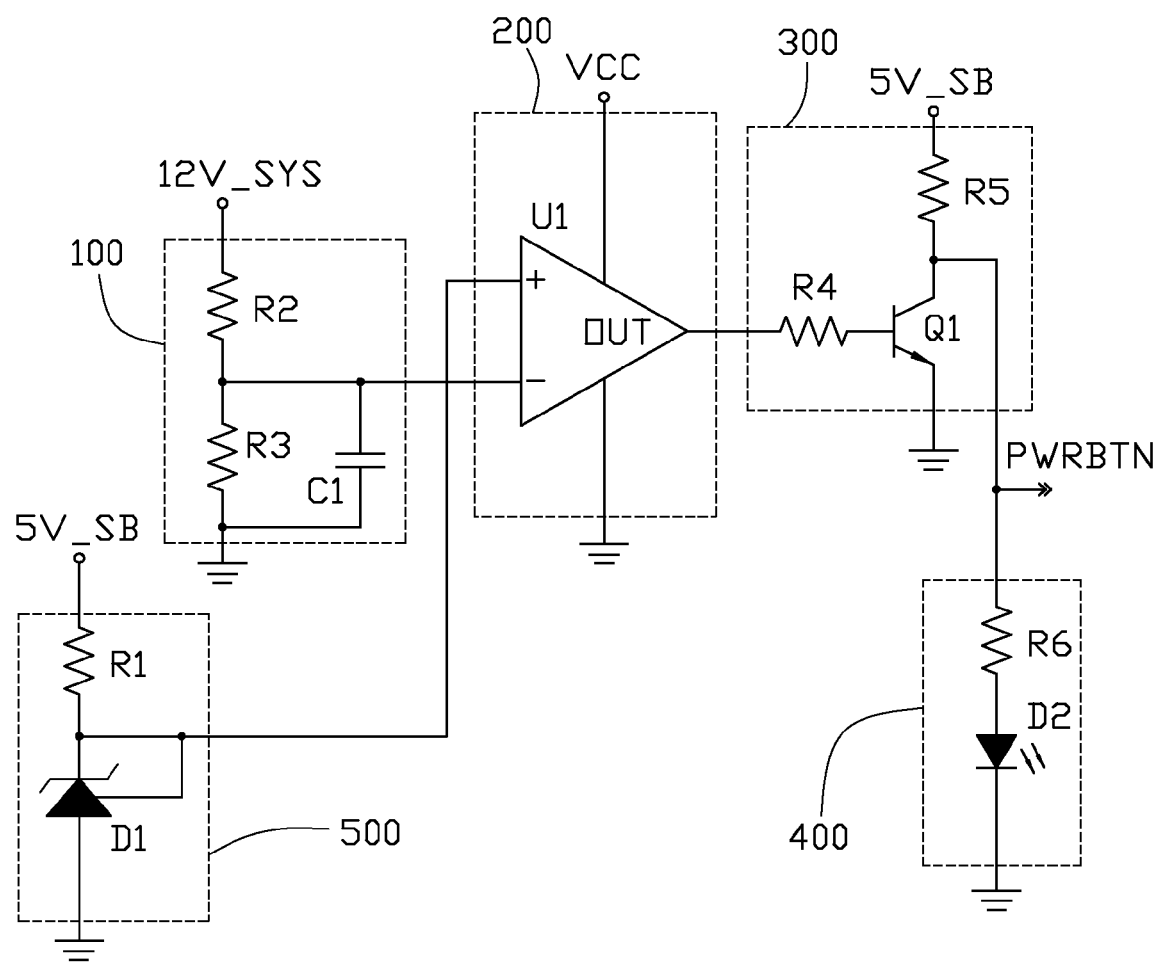

VOLTAGE DETECTION DEVICE

BACKGROUND

1. Field of the Invention

The present invention relates to a voltage detection device.

2. Description of Related Art

A voltage regulator module is mainly used for supplying power to motherboard components of a computer. If the voltage regulator module outputs an under voltage to the motherboard components, the under voltage will cause the motherboard components working abnormally, thereby leading to serious damage of the motherboard components and the motherboard itself. If users continue use the destroyed motherboard, the processors, memories or other important components may be damaged. To ensure the performance and service life of the motherboard components and the motherboard, it is particularly important to closely monitor the voltage from the voltage regulator module to take proper measures, if need be, to protect the motherboard components.

What is needed, therefore, is to provide a voltage detection device capable of detecting the voltage supplied to the computer components, for the purpose of protecting the computer components from damage.

BRIEF DESCRIPTION OF THE DRAWINGS

The drawing is a circuit diagram of a voltage detection device in accordance with an embodiment of the present invention.

DETAILED DESCRIPTION

Referring to the drawing, a voltage detection device includes a voltage divider 100, a comparator circuit 200, a switch circuit 300, an indicator circuit 400, and a voltage stabilizing circuit 500.

The voltage divider 100 includes two resistors R2, R3, and a capacitor C1. The resistors R2 and R3 are connected in series between a 12V system power supply 12V_SYS and ground. The capacitor C1 is connected to the resistor R3 in parallel. A node between the resistors R2 and R3 is connected to the comparator circuit 200.

The voltage stabilizing circuit 500 includes a voltage stabilizing diode D1, and a resistor R1. The voltage stabilizing diode D1 includes an anode grounded, and a cathode and a gate connected to a 5V standby power supply 5V_SB via the resistor R1.

The comparator circuit 200 includes a comparator U1. A non-inverting input terminal + of the comparator U1 is connected the node between the resistor R1 and the cathode of the voltage stabilizing diode D1. An inverting input terminal − of the comparator U1 is connected to the node between the resistors R2 and R3. An output terminal OUT of the comparator U1 is connected to the switch circuit 300. A power terminal of the comparator U1 is connected to a power supply VCC, and a ground terminal of the comparator U1 is grounded.

The switch circuit 300 includes two resistors R4, R5, and an electric switch such as a transistor Q1. The resistor R4 is connected between the output terminal OUT of the comparator U1 and the base of the transistor Q1. The collector of the transistor Q1 is connected to the standby power supply 5V_SB via the resistor R5, connected to the indicator circuit 400, and connected to a power state terminal PWRBTN capable of turning the computer on or off. The emitter of the transistor Q1 is grounded.

The indicator circuit 400 includes a resistor R6 and a light emitting diode (LED) D2. The resistor R6 is connected between the collector of the transistor Q1 and the anode of the LED D2. The cathode of the LED D2 is grounded.

In this embodiment, when the power state terminal PWRBTN receives a low voltage, the computer will turn off. The low voltage is sent out, e.g., by pressing a power-on button to turn off the computer or if the transistor Q1 is turned on. The transistor Q1 is a negative positive negative (NPN) transistor, and can also be replaced by other switches. The power supply VCC is provided by the 12V system power supply 12V_SYS, and can also be provided by other types of system power supplies.

If the standby power supply 5V_SB is within its standard voltage range, after the computer is turned off, the standby power supply 5V_SB is provided, the system power supply 12V_SYS is not provided, and the comparator U1 does not work. The transistor Q1 is off, the standby power supply 5V_SB provides power via the resistors R5 and R6 to turn on the LED D2 to emit light.

When the computer is powered up and the standby power supply 5V_SB and the system power supply 12V_SYS are within their standard voltage ranges, during the time a user presses a power-on button of the computer to start the computer, the power state terminal PWRBTN receives a low level voltage, and the LED D2 will not emit light. When the user releases the power-on button, the system power supply 12V_SYS is provided, the voltage at the non-inverting input terminal + of the comparator U1 is lower than that at the inverting input terminal − of the comparator U1, the voltage at the output terminal OUT of the comparator U1 is at a low level, and the transistor Q1 is off. The standby power supply 5V_SB provides power via the resistor R5 to turn on the LED D2. The LED D2 emitting light while the computer is on (except during the time the power-on button is pressed) indicates that all the power supplies are at their standard voltage ranges.

If the standby power supply 5V_SB is lower than its standard voltage range, and the system power supply 12V_SYS is within its standard voltage range, after the computer is turned off via software, the standby power supply 5V_SB is provided, the system power supply 12V_SYS is not provided, and the comparator U1 does not work. The transistor Q1 is off, and the standby power supply 5V_SB does not provide enough power to turn on the LED D2, and the LED D2 does not emit light, which indicates an abnormal state. In the condition that the standby power supply 5V_SB is lower than its standard voltage range, when the computer is powered on, the system power supply 12V_SYS is provided, the voltage at the non-inverting input terminal + of the comparator U1 is lower than that at the inverting input terminal − of the comparator U1, the voltage at the output terminal OUT of the comparator U1 is at a low level, the transistor Q1 is off, and the LED D2 is off.

Upon the condition that the system power supply 12V_SYS becomes lower than its standard range, while the computer is on, then the voltage at the non-inverting input terminal + of the comparator U1 is higher than that at the inverting input terminal − of the comparator U1, the voltage at the output terminal OUT of the comparator U1 is at a high level, and the transistor Q1 is turned on, therefore no current flows through the LED D2 and it is off. The power state terminal PWRBTN is at a low level, and the computer is turned off.

With the present voltage detection device, function of power supplies can be monitored with status thereof indicated by the LED D2. In summary, if after turning off the computer via software, the LED D2 is not emitting light, then a low standby power supply 5V_SB voltage is indicated. While the computer is on, if the LED D2 is not emitting light and the computer automatically turns off, then a low system power supply 12V_SYS is indicated and possibly the standby power supply 5V_SB is also low.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voltage detection device for a computer, comprising:
   a comparator circuit comprising a first input terminal and a second input terminal connected to a system power supply and a standby power supply respectively, and an output terminal capable of outputting a high or low voltage according to the comparison result;
   a switch circuit comprising a control terminal to receive the voltage output from the comparator circuit, a power terminal to receive the standby power supply, and a ground terminal grounded; and
   an indicator circuit connected to the switch circuit;
   wherein upon a condition that the voltage of the system power supply is lower than its standard voltage range, the voltage of the standby power supply is within its standard voltage range, and the computer is on, the comparator circuit outputs a high voltage, the switch circuit is turned on, the indicator circuit indicates an abnormal state;
   upon a condition that the voltage of the standby power supply is lower than its standard voltage range, the voltage of the system power supply is within its standard voltage range, and the computer is on, the comparator circuit outputs a low voltage, the switch circuit is turned off, the indicator circuit indicates an abnormal state; and
   upon a condition that the voltage of the standby power supply is lower than its standard voltage range, the voltage of the system power supply is within its standard voltage range, and the computer is off; the comparator circuit does not work, the switch circuit is off, and the indicator circuit indicates an abnormal state.

2. The voltage detection device as claimed in claim 1, further comprising a voltage divider connected to the comparator circuit capable of dividing a voltage of the system power supply and providing the divided voltage to the comparator circuit.

3. The voltage detection device as claimed in claim 2, wherein the voltage divider comprises first and second resistors, and a capacitor; the system power supply is grounded via the first and second resistors connected in series, the capacitor is connected to the second resistor in parallel, and a node between the first and second resistors is connected to the first input terminal of the comparator circuit.

4. The voltage detection device as claimed in claim 3, wherein the comparator circuit is a comparator, the second input terminal is a non-inverting input terminal of the comparator connected to the standby power supply, the first input terminal is a inverting input terminal of the comparator connected to the node between the first and second resistors, the output terminal is an output terminal of the comparator connected to the switch circuit, the comparator power terminal is connected to the system power supply, and the comparator ground terminal is grounded.

5. The voltage detection device as claimed in claim 1, wherein the switch circuit further comprises a negative positive negative (NPN) transistor comprising a transistor base as the control terminal, a transistor collector as the power terminal, and a transistor emitter as the ground terminal; a base resistor is connected between the comparator output terminal and the transistor base, the transistor collector is connected to the standby power supply via a collector resistor, connected to the indicator circuit, and connected to a power state terminal.

6. The voltage detection device as claimed in claim 5, wherein the indicator circuit comprises a light emitting diode (LED); a resistor is connected between the transistor collector and the LED anode, and the LED cathode is grounded.

7. The voltage detection device as claimed in claim 4, further comprising a voltage stabilizing circuit comprising a voltage stabilizing diode comprising a grounded anode, a cathode and a gate connected to the standby power supply via a resistor, and connected to the non-inverting input terminal of the comparator.

8. A voltage detection method, comprising:
   providing:
   a comparator circuit comprising a first input terminal and a second input terminal connected to a system power supply and a standby power supply respectively, and an output terminal capable of outputting a high or low voltage according to the comparison result;
   a switch circuit comprising a control terminal to receive the voltage output from the comparator circuit, a power terminal to receive the standby power supply, and a ground terminal grounded; and
   an indicator circuit connected to the switch circuit;
   wherein upon a condition that the voltage of the system power supply is lower than its standard voltage range, the voltage of the standby power supply is within its standard voltage range, and the computer is on, the comparator circuit outputs a high voltage, the switch circuit is turned on, the indicator circuit indicates an abnormal state;
   upon a condition that the voltage of the standby power supply is lower than its standard voltage range, the voltage of the system power supply is within its standard voltage range, and the computer is on, the comparator circuit outputs a low voltage, the switch circuit is turned off, the indicator circuit indicates an abnormal state; and
   upon a condition that the voltage of the standby power supply is lower than its standard voltage range, the voltage of the system power supply is within its standard voltage range, and the computer is off; the comparator circuit does not work, the switch circuit is off, and the indicator circuit indicates an abnormal state.

9. The voltage detection method as claimed in claim 8, wherein further comprising:
   providing:
   a voltage divider connected to the comparator circuit capable of dividing a voltage of the system power supply and providing the divided voltage to the comparator circuit.

10. The voltage detection method as claimed in claim 9, wherein the voltage divider comprises first and second resistors, and a capacitor; the system power supply is grounded via the first and second resistors connected in series, the capacitor is connected to the second resistor in parallel, and a node between the first and second resistors is connected to the first input terminal of the comparator circuit.

11. The voltage detection method as claimed in claim 10, wherein the comparator circuit is a comparator, the second input terminal is a non-inverting input terminal of the comparator connected to the standby power supply, the first input terminal is a inverting input terminal of the comparator connected to the node between the first and second resistors, the output terminal is an output terminal of the comparator connected to the switch circuit, the comparator power terminal is connected to the system power supply, and the comparator ground terminal is grounded.

12. The voltage detection method as claimed in claim 8, wherein the switch circuit comprises a negative positive negative (NPN) transistor comprising a transistor base as the control terminal, a transistor collector as the power terminal, and a transistor emitter as the ground terminal; a base resistor is connected between the comparator output terminal and the transistor base, the transistor collector is connected to the standby power supply via a collector resistor, connected to the indicator circuit, and connected to a power state terminal.

13. The voltage detection method as claimed in claim 12, wherein the indicator circuit comprises a light emitting diode (LED); a resistor is connected between the transistor collector and the LED anode, and the LED cathode is grounded.

14. The voltage detection method as claimed in claim 11, wherein further comprising:
  providing:
    a voltage stabilizing circuit comprising a voltage stabilizing diode comprising a grounded anode, a cathode and a gate connected to the standby power supply via a resistor, and connected to the non-inverting input terminal of the comparator.

15. A voltage detection device for a computer, the voltage detection device comprising:
  a comparator circuit comprising a first input terminal connected to a system power supply, a second input terminal connected to a standby power supply, an output terminal capable of outputting a control voltage according to comparison result, and a power terminal connected to the system power supply to receive a work voltage for the comparator circuit;
  an indicator circuit for indicating whether voltages from the system and standby power supplies are within standard ranges or not; and
  a switch circuit connected between the standby power supply and the indicator circuit, and comprising a control terminal to receive the control voltage from the comparator circuit thereby to control the standby power supply supplied to the indicator circuit or not; a power state terminal of the computer connected to a node between the standby power supply and the indicator circuit, wherein the power state terminal is at a low level when the computer is turned off.

16. The voltage detection device as claimed in claim 15, further comprising a voltage divider connected between the system power supply and the first input terminal of the comparator circuit.

17. The voltage detection device as claimed in claim 15, wherein the switch circuit comprises a transistor, the transistor base is the control terminal connected to the comparator circuit output terminal, the transistor collector is connected to the standby power supply, and the transistor emitter is grounded.

18. The voltage detection device as claimed in claim 15, wherein the indicator circuit comprises a light emitting diode (LED), the LED anode is connected to the standby power supply and the power state terminal via a resistor, and the LED cathode is grounded; the LED is set to be conductive when voltage of the standby power supply is within the standard voltage range.

* * * * *